United States Patent

[11] 3,592,518

| [72] | Inventors | Pierre-Frederic Pfister;<br>Kurt Rubner, both of Sonceboz,<br>Switzerland |
|---|---|---|
| [21] | Appl. No. | 834,332 |
| [22] | Filed | June 18, 1969 |
| [45] | Patented | July 13, 1971 |
| [73] | Assignee | Societe Industrielle de Sonceboz S.A.<br>Sonceboz, Canton of Berne, Switzerland |
| [32] | Priority | June 27, 1968 |
| [33] | | Switzerland |
| [31] | | 9568/68 |

[54] BEARING FOR THE SHAFT OF AN ELECTRIC MOTOR
5 Claims, 14 Drawing Figs.

| [52] | U.S. Cl. | 308/26 |
|---|---|---|
| [51] | Int. Cl. | F16c 27/00 |
| [50] | Field of Search | 308/26, 37, 63, 65, 238 |

[56] References Cited
UNITED STATES PATENTS

| 1,360,787 | 11/1920 | Pennoyer | 308/65 |
| 1,664,880 | 4/1928 | Flintermann | 308/26 |
| 2,635,475 | 4/1953 | Hornbostel | 308/26 |
| 1,162,125 | 11/1915 | Bassett | 308/26 |
| 3,348,887 | 10/1967 | Sheps | 308/26 |

*Primary Examiner*—Fred C. Mattern, Jr.
*Assistant Examiner*—Wesley S. Ratliff, Jr.
*Attorney*—Stevens, Davis, Miller & Mosher ABSTRACT: The bearing comprises two bearings, or bearing elements, proper, one of which is stationary and the other of which a spring holds pressed against the motor shaft.

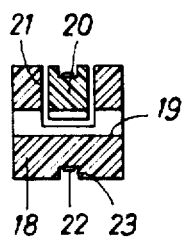
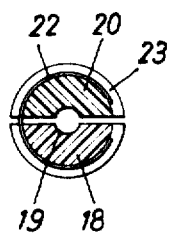
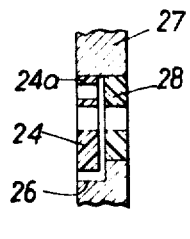
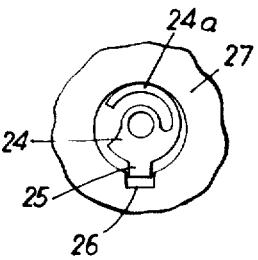
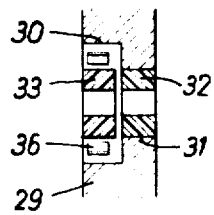
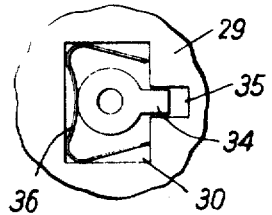
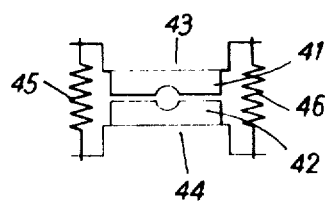
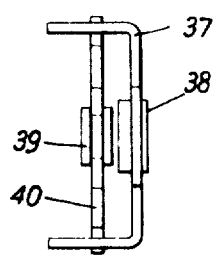
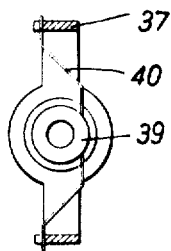
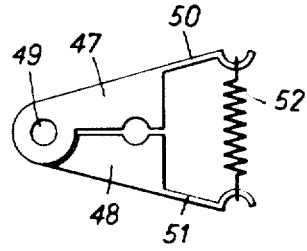
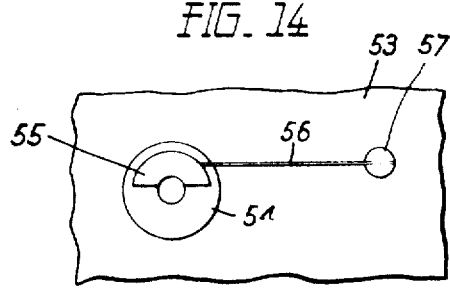

BEARING FOR THE SHAFT OF AN ELECTRIC MOTOR

BACKGROUND OF THE INVENTION

The invention relates to a bearing for the shaft of an electric motor.

It is well known that bearings of which the bearing proper consists of, or is covered with, synthetic plastic are advantageously used in all devices having a rotor and in which the transmitted forces do not attain excessively large values. The synthetic plastic is self-lubricating, it being unnecessary to use oil or grease to reduce the coefficient of friction of the shaft in its bearing, or to prevent seizing.

The synthetic plastic unfortunately is not perfectly inert when exposed to the atmosphere. In particular, it can absorb a certain amount of moisture, causing the dimensions of a synthetic plastic part to vary slightly over a period of time. This fact renders it necessary to provide between the shaft and the synthetic plastic bearing proper a degree of play that is greater than is the case for conventional bearings, such as those of bronze.

Electric motors, particularly those of which the rotor consists of permanent magnets, tend to vibrate. When the magnetic field of the stator changes position, the rotor is caused to change its position suddenly, and it oscillates slightly about its new position until it is attracted once again by the moving stator field. It is apparent that if the bearing play is relatively great, this vibration can cause a disturbing noise and, moreover, repeatedly pull at the motor mount, which can lead to undesirable consequences.

SUMMARY OF THE INVENTION

The purpose of the invention is to provide a bearing which avoids these drawbacks and which can comprise bearings proper made of synthetic plastic and dimensioned to provide sufficient play without risking vibration in operation.

BRIEF DESCRIPTION OF THE DRAWINGS

The invention will be described, with reference to the Figures of the drawings, wherein:

FIGS. 4 and 5 are respectively views in longitudinal and cross section of a second embodiment;

FIGS. 6 and 7 are respectively views in longitudinal section and front elevation of a third embodiment.

FIGS. 8 and 9 are views, respectively corresponding to FIGS. 6 and 7, of a fourth embodiment;

FIGS. 10 and 11 are respectively a side view and a rear end view partly in section of a fifth embodiment;

FIG. 12 is a simplified end view of a sixth embodiment;

FIG. 13 is a simplified end view of a seventh embodiment; and

FIG. 14 is a front elevation of the last embodiment.

DESCRIPTION OF THE PREFERRED EMBODIMENTS

Figure 1:
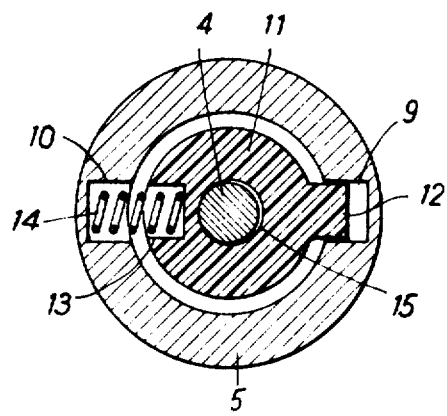
FIG. 1 is a view in cross section taken along line I—I of FIG. 2 of a first embodiment.
Figure 2:
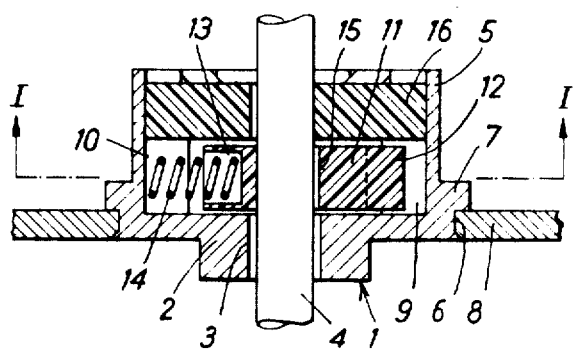
FIG. 2 is a diametrical section of the first embodiment.
Figure 3:
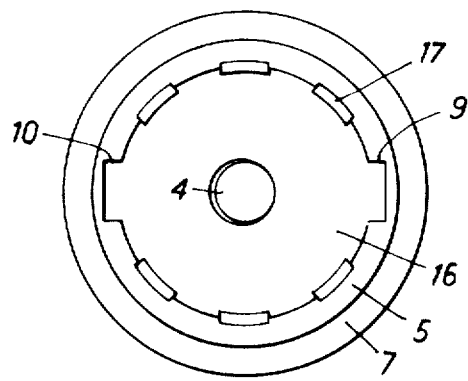
FIG. 3 is a top view of the first embodiment.

The bearing shown in FIGS. 1, 2, and 3 comprises a metal cup 1 which is the housing of the bearing. The cup has a bottom 2 incorporating a central opening 3 of which the diameter is clearly larger than that of the shaft 4 of the motor that embodies the bearing. The cup is round. The base of the cup cylindrical wall 5 has a projection fitted and bent over in the opening 6 of some part 8 of the frame or mount, such as one of the end plates or end walls of the motor. The outer face of the wall 5 has a collar 7, which is in contact with the upper face of the part 8.

By comparing FIGS. 1 and 3 it is possible to see that the wall 5 is slightly thicker in its lower part than in its upper part. This wall embodies two diametrically opposite recesses 9 and 10, of rectangular cross section, which extend from the bottom 2 up to the rim of the cup. A first bearing proper, or bearing element, 11, generally cylindrical in shape and made of a suitable synthetic plastic, is held in the cup 1 free to move therein in a direction perpendicular to the axis of the cup. On one side, the bearing 11 has a rib 12 that corresponds to the recess 9, and diametrically opposite it has a cylindrical recess 13, which the rib 12 holds opposite the recess 10. A compression spring 14 presses the sidewall of the internal opening 15 of the bearing 11 against the motor shaft 4, which is supported by a fixed bearing proper, or bearing element, 16. The bearing 16 is fitted to the internal diameter of the upper part of the wall 5, as seen in FIG. 3, and incorporates two diametrically opposed ribs that are respectively held in the recesses 9 and 10. The bearing 16 rests on the shoulder that is formed where the thickness of the wall 5 changes from that shown in FIG. 1 to that shown in FIG. 3. The ribs held in the recesses 9 and 10 prevent the bearing 16 from turning, and crimps 17 prevent it from loosening upwards. As shown in FIG. 2, the central openings of the two bearings 11 and 16 can provide sufficient play to satisfy the conditions imposed by the use of synthetic plastic. Nevertheless, the spring 14 eliminates any possibility of the motor shaft 4 vibrating in these bearings.

A second embodiment, shown in FIGS. 4 and 5, comprises a fixed bearing 18, generally cylindrical and having a cylindrical opening 19, and a semicylindrical, movable bearing 20. The bearing 18 embodies centered along its length a diametrical slot 21, which holds the bearing 20. An arcuate spring 22 hugs the bottom of a groove 23 provided partly in the bearing 18 and partly in the bearing 20.

FIGS. 6 and 7 show a third embodiment of the invention, similar to the first, but having a movable bearing 24 that embodies an elastic arm 24a, which serves the same purpose as does the spring 14. The rib 25 of the bearing 24 guides the latter in the recess 26 incorporated by the bearing housing 27, which need not be a separate part but instead can be composed by some member of the motor housing or frame. In this embodiment, the fixed bearing 28 is perfectly cylindrical, and is mounted in an opening of the housing 27.

In the embodiment shown in FIGS. 8 and 9, there is once again a bearing housing, or support, 29 that the motor housing or frame can compose. The support has a rectangular recess 30 of which the bottom has a circular opening 31 for holding the fixed bearing 32. The movable bearing 33, guided by its rib 34 engaging the recess 35, is contained in the recess 30 and held in place by a curved flat spring 36. The movable bearing 33 is simpler in shape than the movable bearings 11, 20, and 24 of the previous embodiments. In the embodiments of FIGS. 6, 7 and 8, 9, the recess for the movable bearing can be closed by a plate on the side remote from the fixed bearing.

The embodiment shown in FIGS. 10 and 11 has a support 37 in the form of a bar bent at either end and provided with a central hub 38, in the opening of which the stationary bearing is fixed. The movable bearing 39 is also circular and arranged near one end of the fixed bearing. The bearing 39 is held in place simply by a flat spring 40 bent to form a trapezoid and pressing on the movable bearing and on the ends of the support 37.

It is particularly easy to assemble the bearing of this embodiment.

FIGS. 12 and 13 show two symmetrical embodiments of the invention, the two bearing elements having semicylindrical bearing surfaces and being located side by side, rather than end on, as previously. In FIG. 12, the two bearing elements 41 and 42, made of synthetic plastic, have each a semicircular groove and are rigidly mounted on a respective support member 43 and 44. One of these members is fixed, whereas the other, which advantageously moves in a suitable guide arrangement, is held drawn to the fixed member by springs 45 and 46 fixed to the support member 44. In the embodiment shown in FIG. 13, the two bearing elements 47 and 48 also embody each a semicircular groove and are free to swing on a pivot 49. A spring 52, which eliminates play in the bearing, is stretched between the arms 50 and 51 of the bearings 47 and 48.

In the embodiment shown in FIG. 14, there are a member 53 of the motor frame or housing, a fixed cylindrical bearing 54 held in a round opening of the part 53, and a semicylindrical bearing 55 having a semicircular groove that presses against the motor shaft and a flat-bottomed recess in its outer face. One end of a straight, flat spring 56 presses on the bottom of this recess, while the other end is securely held in a slot embodied in a stud 57 fixed to the member 53.

In all of the embodiments described, the bearing of the invention comprises two bearings proper having each a partial or complete cylindrical surface, and one of these bearings proper being applied to the motor shaft by a resilient means. The dimensions of the actual bearing surfaces of the bearings are chosen with respect to the shaft diameter so as to provide play sufficient to preclude any possibility of seizing or jamming during operations but not to permit the shaft to vibrate.

In these embodiments, the bearing surfaces are embodied in solid elements of synthetic plastic, which are easily manufactured by injection molding. These bearings proper can also be made of some other material, such as metal, and the actual bearing surfaces provided with a thin coating of synthetic plastic.

The bearings of the invention are suitable for electric motors of all kinds, but they are particularly advantageous in motors with permanent magnet rotors, especially those of small size.

Although the preferred embodiments of the invention have been described, the scope of, and the breadth of protection afforded to, the invention are limited solely by the appended claims.

What we claim is:

1. A bearing for the shaft of an electric motor, comprising first and second bearing elements of synthetic plastic each having a cylindrical opening for accepting and guiding said shaft, a fixed support for holding said first bearing element, and resilient means for pressing said second bearing element against said shaft, said second bearing element being movable and having rib means engaging recess means provided in said support to guide said movable bearing element with respect to said support.

2. A bearing as defined in claim 1, wherein said resilient means comprises a single piece with said movable bearing element.

3. A bearing as defined in claim 1, wherein said support comprises a bottom wall having an opening therein, and a cylindrical sidewall, said first bearing element being held fixedly inwardly of said sidewall, said movable bearing element being located between said bottom and said first bearing element, and said resilient means engaging a plurality of recesses provided in said sidewall and in said movable bearing element respectively, said plurality of recesses being diametrically disposed with respect to said cooperating rib and recess.

4. A bearing for the shaft of an electric motor, comprising first and second bearing elements of synthetic plastic, each having a cylindrical opening for accepting and guiding said shaft, a fixed support for holding said first bearing element, and resilient means for pressing said second bearing element against said shaft, said second bearing element being movable and having rib means engaging recess means in said first bearing element to guide said movable bearing element with respect to said first bearing element.

5. A bearing for the shaft of an electric motor, comprising first and second bearing elements of synthetic plastic, a bearing surface for guiding said shaft, incorporated by each said first and second bearing elements, a fixed support for holding said first bearing element, said support having a recess for containing said second bearing element, said second bearing element being movable with respect to said first bearing element, and resilient means disposed between said movable bearing element and said support for pressing said movable bearing element against the shaft.